R. W. GIESE & P. F. REILLY.
SIGNALING DEVICE.
APPLICATION FILED NOV. 9, 1914.
1,130,393.
Patented Mar. 2, 1915.
2 SHEETS—SHEET 2.
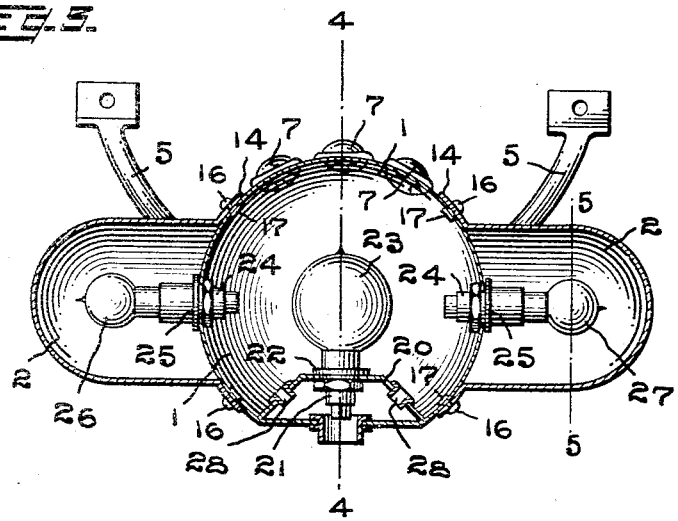
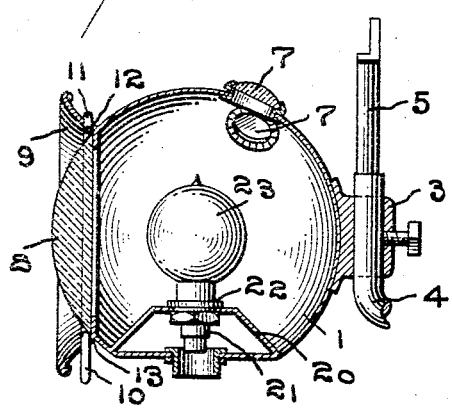
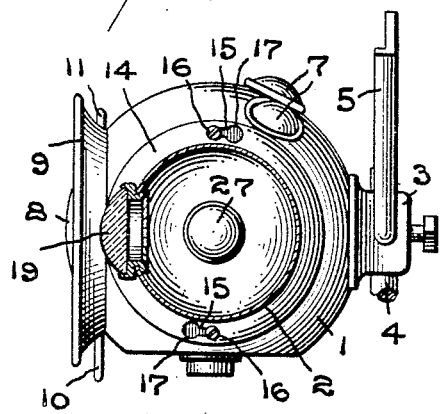
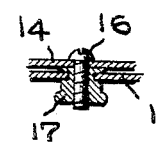
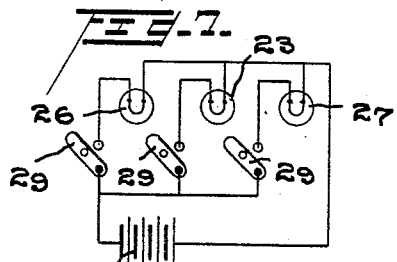
Witnesses
L. R. Moyer
C. R. Ziegler.
Inventors
Robert W. Giese,
Patrick F. Reilly
By Joshua R. H. Potts
Attorney

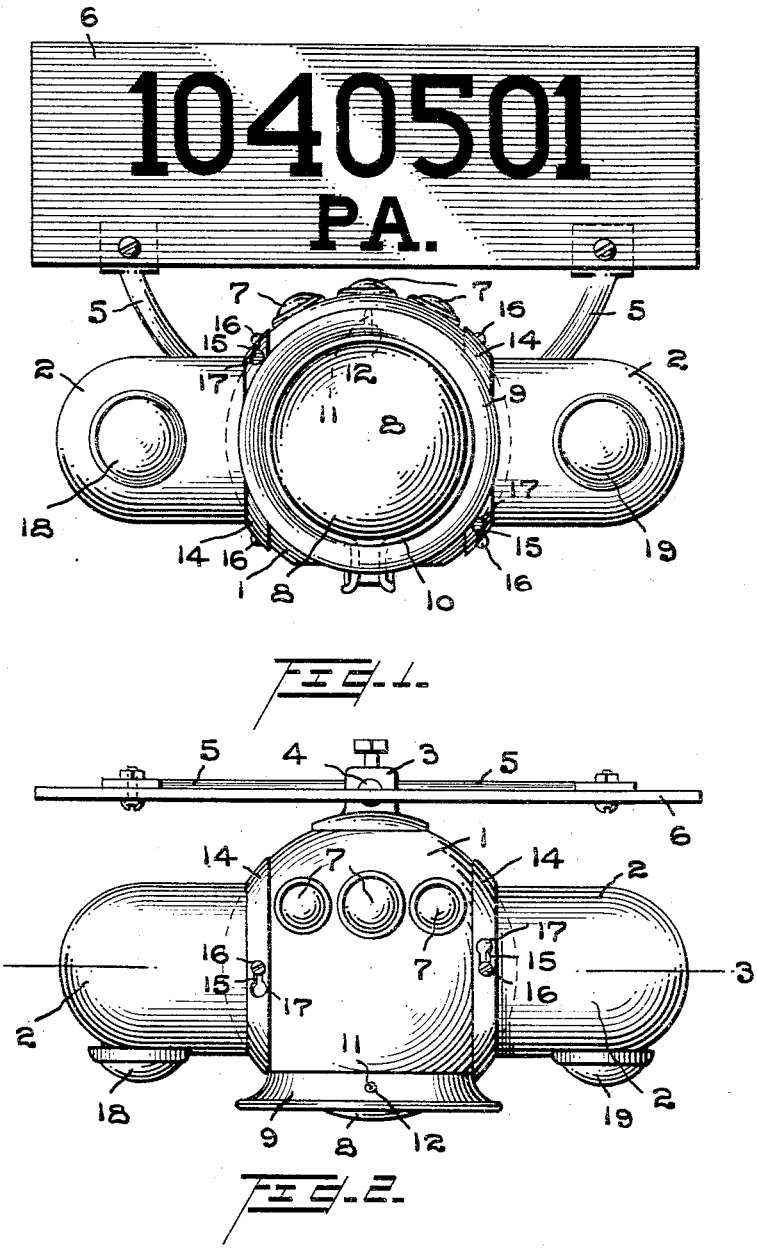

UNITED STATES PATENT OFFICE.

ROBERT W. GIESE AND PATRICK F. REILLY, OF PHILADELPHIA, PENNSYLVANIA.

SIGNALING DEVICE.

1,130,393.

Specification of Letters Patent. Patented Mar. 2, 1915.

Application filed November 9, 1914. Serial No. 871,127.

*To all whom it may concern:*

Be it known that we, ROBERT W. GIESE and PATRICK F. REILLY, citizens of the United States, residing at Philadelphia, in the county of Philadelphia and State of Pennsylvania, have invented certain new and useful Improvements in Signaling Devices, of which the following is a specification.

Our invention relates to improvements in signaling devices, the object of the invention being to provide a signaling device which is adapted to be supported on an automobile or other vehicle, and controlled by the operator to signal to the occupants of another vehicle, the intention of the operator with relation to the movements of his automobile.

A further object is to provide a signaling device having a plurality of electric lamps, each causing the illumination of a lens or other transparency, and all of said transparencies of different colors.

A further object is to provide a device of the character stated which may be located on any desired part of the vehicle, but which is preferably at the rear and performs the function of license tag support and lamp for illuminating the same.

With these and other objects in view, the invention consists in certain novel features of construction and combinations and arrangements of parts as will be more fully hereinafter described and pointed out in the claims.

In the accompanying drawings: Figure 1 is a view in front elevation illustrating our improvements. Fig. 2 is a top plan view. Fig. 3 is a view in longitudinal section on the line 3—3 of Fig. 2. Fig. 4 is a view in vertical transverse section on the line 4—4 of Fig. 3. Fig. 5 is a view in vertical transverse section on the line 5—5 of Fig. 3. Fig. 6 is a fragmentary view in section on an enlarged scale showing the mounting of one of the screws, and Fig. 7 is an electric diagram.

Our improved signaling device comprises a central relatively large spherical casing 1, to which two relatively small end casings 2, 2, are removably connected.

The central casing 1 has a coupling block 3 secured to the rear thereof, and adapted to be connected to any ordinary supporting bracket 4. The block 3 is made with two upwardly projecting arms 5 to which a license tag 6 is adapted to be secured, and supported thereby in a position above and slightly to the rear of casing 1, in position to receive light thrown thereupon by a series of lenses 7 located in the wall of casing 1.

The front of casing 1 is closed by a relatively large lens 8 of red glass which is held in a flaring ring 9 by means of a spring wire holder 10. This wire holder 10 has a lug 11 projecting from its intermediate portion which is projected through an opening 12 in the ring 9, and at its ends is projected through a slot 13 in the ring. When the ends of the wire holder are moved toward each other, the holder can be easily removed, and when the ends are sprung apart, the holder will effectually hold the lens 8 in the casing.

The end casings 2 are of general cylindrical form with rounded outer closed ends and open inner ends. The open inner ends of the end casings 2 are made with flaring annular flanges 14 which fit against the outer face of casing 1, and are formed with slots 15 to receive clamping screws 16 on casing 1 to secure the parts rigidly together.

The screws 16 engage screw-threaded eyelets 17 riveted in casing 1, and their heads bear against the flanges 14. The slots 15 have enlarged ends 17 to admit the heads of the screws, but when the end casings are given a partial turn, the screws are positioned in the other ends of the slots and can be turned to effectually clamp the end casings 2 in place.

The end casings 2 have lenses 18 and 19 respectively in the forward faces, the lens 18 being preferably green and the lens 19 white.

An arched support 20 is secured in the bottom of casing 1, and has a plug 21 secured therein. The plug 21 is provided at its upper end with a socket 22 to receive an electric lamp 23, and the lower end of the plug is to be connected by wires (not shown) to the source of electricity. Similar plugs 24 are secured in the sides of casing 1 and have sockets 25 at their outer ends located in end casings 2 and supporting electric lamps 26 and 27 respectively. The inner ends of the plugs are adapted to be connected by wires (not shown) with the source of electricity, and are positioned through insulating rings 28 in support 20.

In Fig. 7, an electric diagram is shown illustrating a simple arrangement of circuits, each having a switch 29 controlling the opening and closing of each circuit including the lamp and the source of electricity 30.

Our preferable way of signaling is as follows: The lamp 23 remains lighted to illuminate the red lens 8 and to throw the light through the lenses 7 onto the license tag 6. Lamp 27 is lighted to illuminate the white lens 19 when turning to the right, and lamp 26 is lighted to illuminate the green lens 18 when turning to the left. All lights are lighted to illuminate all lenses when it is intended to slow up or stop. These particular rules for signaling may of course be varied, other colors of lens may be employed and other styles of lens may be used without departing from our invention, the details of construction described and illustrated constituting but one embodiment of our invention. Hence, various slight changes might be made in the general form and arrangement of parts described without departing from our invention, and hence we do not limit ourselves to the precise details set forth, but consider ourselves at liberty to make such changes and alterations as fairly fall within the spirit and scope of the appended claims.

Having thus described our invention, what we claim as new and desire to secure by Letters Patent is:

1. A signaling device, comprising a central casing, a lamp in the casing, two lamps supported on the outside of the casing, and end casings removably secured to the first-mentioned casing and inclosing the last-mentioned lamps, said casings each having transparent portions, substantially as described.

2. A signaling device, comprising a central casing, a lamp in the casing, two lamps supported on the outside of the casing, end casings removably secured to the first-mentioned casing and inclosing the last-mentioned lamps, all of said casings having lenses therein, the lenses being of different colors, substantially as described.

3. A signaling device comprising a central spherical casing, end casings having annular flaring flanges at their inner ends, said flanges having slots therein, screws in the center casing positioned in the slots and removably clamping the flanges to the center casing, lamps in each casing, lenses of different colors in the respective casings, and all of said lamps supported by the central casing, substantially as described.

In testimony whereof we have signed our names to this specification in the presence of two subscribing witnesses.

ROBERT W. GIESE,
PATRICK F. REILLY.

Witnesses:
 ROSEMARIE REILLY,
 HELEN E. REILLY.